Sept. 19, 1944.      L. A. SMITH      2,358,541
DRILLING AND COUNTERSINKING TOOL
Filed Dec. 23, 1942
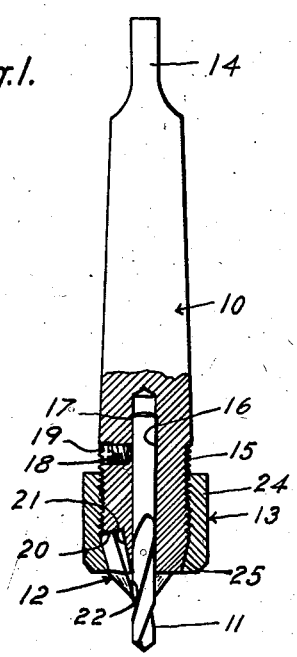
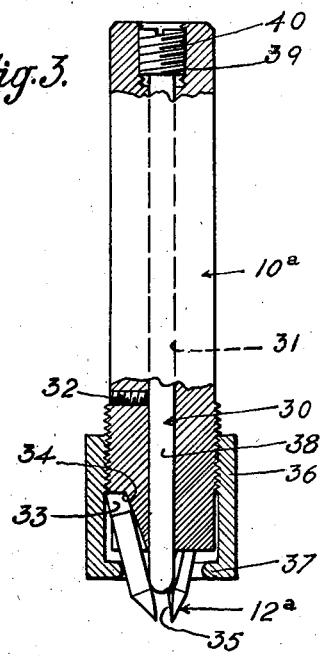
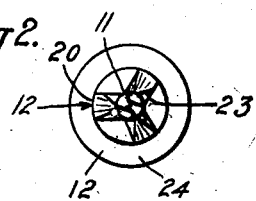
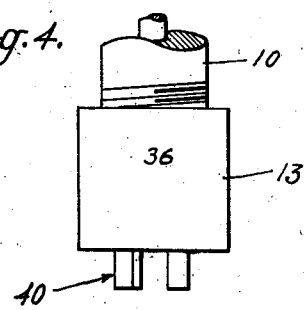
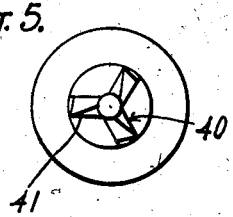
Inventor
Lawson A. Smith
by
Attorney Patented Sept. 19, 1944

2,358,541

UNITED STATES PATENT OFFICE 2,358,541

DRILLING AND COUNTERSINKING TOOL

Lawson A. Smith, Los Angeles, Calif., assignor to Robert H. Clark, Los Angeles, Calif.

Application December 23, 1942, Serial No. 469,859

4 Claims. (Cl. 77—66)

This invention relates to boring or drilling tools and relates more particularly to a combination drilling tool and countersinking tool. A general object of this invention is to provide a simple, practical and effective drilling and countersinking tool.

In the manufacture and construction of numerous structures and machines it is necessary to inset or countersink the heads of the screws, bolts, and other fastening parts. In such cases it has been the general practice to first drill the openings for the reception of the screws or bolts and then form the counterbores or countersinks to receive the screw heads or bolt heads. Separate tools are employed for the drilling and countersinking operations and it has been necessary to provide and maintain the required drills and the countersinks and to carry on two entirely separate series of operations, one for the drilling of the openings and the other for the forming of the countersink depressions.

Another object of this invention is to provide a single tool operable to drill an opening or bore and to form a counterbore or countersink depression at the mouth of the bore, the tool performing the boring and countersinking in one continuous operation.

Another object of the invention is to provide a countersink tool requiring a minimum amount of tool steel or other hard cutting material.

Another object of this invention is to provide a tool of the character mentioned in which the countersinking means is mounted on the tool body to come into engagement with the work immediately following the drilling of the opening by merely continuing the feed or advancement of the tool.

Another object of this invention is to provide a tool of the character referred to in which the countersinking means embodies simple, readily installed and easily replaced bits.

Another object of this invention is to provide a drilling and countersinking tool of the character mentioned having simple, effective means for removably mounting the countersink bits in their operative positions.

Another object of this invention is to provide a tool of the character referred to in which both the drill and the countersink bits may be removed for resharpening or for replacement by drills and bits of different shapes, sizes, etc.

Another object of this invention is to provide a drilling and countersinking tool of the character mentioned in which a simple integral body carries both the drill and countersink bits. The one piece body of the tool may be in the nature of an adapter or socket for engagement in the spindle of a drill press, drilling machine, or other tool or machine suitable for drilling and countersinking operations.

Another object of this invention is to provide an adjustable countersinking tool. The tool of this invention is readily adjustable to form counterbores or countersink depressions of different diameters and with walls pitched at different angles.

A further object of this invention is to provide an adjustable countersinking tool having readily replaceable bits so that the tool may be quickly reconditioned when the bits become dull and so that the tool may be easily converted or adapted for operating on materials of different natures and for the formation of counterbores and countersink depressions of different configurations, sizes, etc.

The various objects and features of my invention will be fully understood from the following detailed description of typical preferred forms and applications of my invention, throughout which description reference is made to the accompanying drawing, in which:

Fig. 1 is a side elevation of one form of tool provided by this invention, with the principal parts appearing in longitudinal cross section. Fig. 2 is an end view of the tool illustrated in Fig. 1. Fig. 3 is a longitudinal detailed sectional view of the adjustable boring and countersinking tool of the invention with a portion of the body appearing in side elevation. Fig. 4 is a fragmentary side elevation of another form of the invention, and Fig. 5 is an end view of the structure illustrated in Fig. 4.

The embodiment of the invention illustrated in Figs. 1 and 2 of the drawing may be said to comprise, generally, a body 10 for carrying a drill 11, countersinking bits 12 and means 13 for removably retaining the bits 12 on the body.

The body 10 may be varied in shape and construction to adapt the tool for different uses and to permit the use of the tool in different types of drilling and countersinking tools and machines. In the drawing the body 10 is in the form of an adapter or socket intended to be inserted in the spindle of a machine, it being apparent that the body 10 may be of different design. The body 10 is preferably an elongate one-piece member. In the case illustrated the body 10 is longitudinally tapered throughout the greater part of its length and is provided at its inner end with a flat sided tang 14 to facilitate the transmission of rotation to the tool. The forward portion 15 of the body 10 is cylindrical and the forward end corner of the body is bevelled or rounded off. A longitudinal opening 16 enters the body 10 from its forward end to receive the drill 11. The opening 16 may be shaped and proportioned to receive the shanks of the selected or required types of drills. In the form of the invention illustrated the opening 16 is a simple bore of uniform diameter and of substantial depth.

The drill 11 may be of any selected type, diameter and length. In the drawing I have shown a typical drill 11 having a plain cylindrical shank 17 which removably fits the body opening 16. Means is provided for retaining the drill 11 in the body opening 16 and for transmitting rotation from the body to the drill. This means may comprise a set screw 18 threaded in a radial opening 19 in the wall of the body 10 to engage or clamp against the drill shank 17.

The countersinking bits 12 are arranged on the body 10 to project from its forward end so that they may cut or form a counterbore or countersink depression in the work around the opening formed by the drill 11. The bits 12 are such that they may effectively form the countersink immediately following the drilling of the opening, that is, the forward advancement of the tool may be continued after the completion of the drilled opening to advance the bits 12 against the work so that the drilled opening and the countersink depression are formed in one continuous operation. In accordance with the invention there is a plurality of bits 12 separately mounted on the body 10. In the drawing I have shown three identical bits 12, it being understood that there may be two, three, or more bits, as desired.

The body 10 is formed to removably support the bits 12 in their active cutting positions. The forward end of the body 10 has slots or grooves 20 for the reception of the bits 12. The grooves 20 are preferably identical and equally circumferentially spaced. The side walls of the grooves 20 are flat and parallel and the grooves preferably have flat inner walls 21. The inner walls 21 are pitched forwardly and inwardly relative to the central longitudinal axis of the tool. The inclination or pitch of the several walls 21 is the same in the several grooves 20. The upper end walls of the grooves 21 are abrupt but may be concave if desired. The grooves 20 extend to the forward end of the body 10 where they are open so that the bits 12 may project beyond the body for engagement with the work. The grooves 20 join or merge with the drill carrying opening 16 so that the bits 12 may bear inwardly against the drill. The individual grooves 20 may lie in planes that are radial with respect to the longitudinal axis of the tool or may lie in planes pitched with respect to said axis. I usually prefer to pitch the grooves 20 slightly forward relative to the normal right-hand direction of rotation of the tool so that the bits 12 have a more effective cutting action.

The bits 12 are independent parts removably engaged in their respective grooves 20. The several cutting parts or bits 12 are preferably alike or identical. The bits 12 are in the nature of blocks of suitable cutting material such as tool steel, high speed steel, or the like. In the construction illustrated the bits 12 are square or rectangular in transverse cross section and their side surfaces and inner surfaces bear on the corresponding walls of the grooves 20. The upper ends of the bits 12 are adapted to cooperate with the upper walls of the grooves 20 to definitely stop or position the bits. The lower or active end portions of the bits 12 are shaped to bear inwardly against the drill 11 and to have effective cutting engagement with the work. The inner sides of the protruding portions of the bits 12 have concave surfaces 22 for bearing inwardly against the drill 11. These bearing surfaces 22 may extend to the lower extremities of the bits 12. With the bits 12 correctly seated in their grooves 20 to bear inwardly against the drill 11 the bits project a substantial distance from the lower end of the body 10 and their projecting portions are shaped or dressed to have effective cutting engagement with the work to form a counterbore or countersink of the desired shape and depth.

The active projecting portions of the cutting parts of the bits 12 may be given various shapes to cut countersink depressions of the selected configurations. In the construction illustrated the projecting portions of the bits 12 are dressed or bevelled off at their opposite sides to have downwardly convergent surfaces and the outer surfaces are dressed off to slope downwardly and inwardly toward the drill 11. This provides the bits 12 with effective cutting edges 23. It will be apparent how the projecting portions of the cutting parts or bits 12 may be ground or dressed in other ways to have the required form of cutting edges.

The means for removably securing the bits 12 to the body 10 is characterized by its simplicity. The means 13 comprises a simple collar or sleeve 24 removably screw-threaded on the cylindrical body portion 15. The lower end of the sleeve 24 has an annular inturned lip 25. The inner surface of the lip 25 is adapted to cooperate with the outer faces of the bits 12 to clamp and retain the bits in their grooves 20. As illustrated in Fig. 1, the inner face of the lip 25 is pitched downwardly and inwardly so that it may flatly cooperate with the outer faces of the divergent bits 12 to firmly hold them in their grooves 20.

It is believed that the operation of the tool illustrated in Figs. 1 and 2 of the drawing will be readily understood. The drill 11 is easily inserted in the opening 16 and secured to the body 10 by the set screw 18. The countersink bits 12 of the selected size and shape are easily inserted in their grooves 20. With the bits 12 in place the sleeve 24 is threaded on the body 10 so that its lip 25 comes into engagement with the bits 12. The sleeve 24 may be tightened to securely retain the bits 12 in their grooves. When the tool is being operated by a suitable drilling machine, either stationary, portable or manual, the drill 11 is advanced against the work and is fed into the work to form the bore. When it is desired to also form a counterbore the advancement is continued so that the active ends of the countersink bits 12 come into engagement with the work. The countersink bits 12 readily form or drill the countersink depression at the mouth of the bored opening. It is to be observed that the drilling and countersinking are performed in a single continuous operation by a single machine. The drill 11 is dependably supported and is braced by the countersinking bits 12 which bear inwardly against it at circumferentially spaced points beyond the end of the body 10. The bits 12 provide additional support for the drill.

The drill 11 may be easily removed at any time for replacement or sharpening. The countersinking bits 12 may also be removed. To remove the bits 12 the sleeve 24 is merely unthreaded from the body 10 to leave the bits 12 exposed. The bits are easily disengaged from their grooves 20. The bits may be redressed and then replaced or replacement bits 12 of the same shape or of different shapes may be replaced on the body 10. In practice sets of bits 12 designed to form counterbores and countersink depressions of different sizes and shapes may be provided with the tool.

Fig. 3 of the drawing illustrates a form of the invention that is useful both as a drill holder or socket and as an adjustable countersink. This form of the invention includes, generally, a body 10ª, countersinking bits 12ª removably mounted on the body 10ª, and means 30 for adjusting the bits 12ª.

The body 10ª may be similar, generally, to the body 10. In practice the body 10ª may be an integral elongate member adapted to be received in machine spindles, chucks, etc. In this form of the invention I prefer to make the body 10ª cylindrical or of uniform external diameter. A central longitudinal opening 31 extends through the body 10ª from one end to the other. When the tool is to be employed as a drill holder the opening 31 serves to receive the shank of the drill and when the tool is to be employed as an adjustable countersink the opening 31 carries adjusting means 30. A retractable set screw 32 may be threaded in a lateral opening in the body 10ª to clamp against the drill shank when the tool is utilized as a drill holder.

The forward end portion of the body 10ª is formed to carry the adjustable countersink bits 12. A plurality of circumferentially spaced grooves 33 is provided in the forward end of the body to carry the bits. There may be two, three or more equally circumferentially spaced grooves 33. The grooves 33 may resemble the above described grooves 20 and preferably have flat side walls. The inner walls 34 of the grooves 33 are flat and are pitched downwardly and inwardly with respect to the longitudinal axis of the tool. The grooves 33 join or merge with the opening 31.

The countersinking bits 12ª are cutting parts removably and adjustably engaged in the grooves 33 to project beyond the lower end of the body 10ª to have active engagement with the work. The bits 12ª may be similar to the above described bits and are shaped to slidably engage in the grooves 33. In the form of the invention illustrated the bits 12ª are square or rectangular in transverse cross-section and are of substantial length. The side surfaces of the bits 12ª bear on the side walls of the grooves 33 and the inner sides of the bits are adapted to ride on the sloping inner walls 34. Concave surfaces 35 are provided on the inner sides of the bits 12ª adjacent their lower ends. The active lower end portions of the bits 12ª are suitably shaped and dressed to have the desired cutting action and to form the countersink depressions of the required shape. I have shown the bits 12ª provided with active cutting edges of substantially the same kind as in the previously described form of the invention.

Means is provided for retaining the bits 12ª on the body 10ª. This means includes a sleeve 36 removably screw-threaded on the forward end of the body 10ª. The sleeve 36 extends beyond the end of the body 10ª and its protruding portion has an inturned annular lip 37. The lip 37 is engageable with the outer surfaces of the countersinking bits 12ª. The bit engaging surfaces of the lip 34 may be rounded or convex.

The adjusting means 30 is operable to adjust the bits 12ª radially so that they may form countersink depressions or counterbores of different diameters and of different angles or pitches. The means 30 includes a stem 38 in the body opening 31. The stem 38 is adapted to project from the forward end of the body 10ª to have cooperation with the inner sides of the countersink bits 12ª. The projecting end of the stem 38 may be beveled or may be rounded, as shown. Means is provided for advancing and retracting the stem 38 to provide for the adjustment of the bits 12ª. This means comprises an enlarged head 39 on the stem 38 adjustably screw threaded in a socket 40 in the inner end of the body 10ª. The outer end of the head 39 may have a screw driver slot or other means to facilitate its engagement by a turning tool.

In the use of the tool illustrated in Fig. 3 bits 12ª of the selected size and shape are engaged in their grooves 33 and the sleeve 36 is threaded on the body 10ª. The stem 38 may then be adjusted to set or adjust the bits 12ª. The head 39 may be readily engaged by a screw driver or the like for threadably adjusting the stem 38. It will be seen that when the stem 38 is fed forwardly the bits 12ª are spread or adjusted outwardly. On the other hand, when the stem 38 is shifted rearwardly the bits 12ª are permitted to retract or move inwardly. The sleeve 36 may be threaded inwardly or outwardly during the adjustment or operation of the stem 38 to permit the outward adjustment or expansion of the bits 12ª in their adjusted positions. The tool of Fig. 3 carries removable countersink bits 12ª that may be replaced by bits of different shapes and the tool embodies the means 30 for adjusting the selected bits to form counterbores or countersink depressions of any selected diameter and pitch or inclination.

Figs. 4 and 5 of the drawing illustrate counterbore bits 40 useful in making cylindrical counterbores and in facing off flat surfaces around the drilled openings. The bits 40 may be employed either in the form of tool illustrated in Figs. 1 and 2 or in the tool illustrated in Fig. 3. The bits 40 are removably engaged in the grooves 21 or the grooves 33, as the case may be, and protrude from the lower end of the tool. The projecting portions of the bits 40 are dressed or shaped to have cutting edges 41 which lie in a plane substantially normal to the longitudinal axis of the tool. These cutting edges 41 may be radial or may be pitched with respect to radial lines of the tool. It is believed that it will be apparent how the bits 40 illustrated in Figs. 4 and 5 of the drawing may be utilized in the above described tools of the invention to form cylindrical counterbores and to face off flat surfaces around the drilled openings.

Having described only typical preferred forms and applications of my invention, I do not wish to be limited or restricted by the specific details herein set forth, but wish to reserve to myself any variations or modifications that may appear to those skilled in the art or fall within the scope of the following claims.

Having described my invention, I claim:

1. A tool of the character described including a body having a shank for mounting it in a machine and having a bore entering it from its forward end and adapted to receive and hold a drill and having spaced grooves extending longitudinally in it from said end, the inner walls of the grooves being pitched to converge toward a point beyond said end of the body, countersink bits removably engaged in said grooves to engage said walls and project from said end of the body in converging relation, and means for holding the bits in the grooves.

2. A tool of the character described including a body having a bore entering it from its forward end and adapted to receive and hold a drill and having spaced grooves extending longitudinally in it from said end, there being shoulders at the inner ends of the grooves, the inner walls of the grooves being pitched to converge toward a point beyond said end of the body, countersink bits removably engaged in said grooves to engage said walls shoulders and project from said end of the body in converging relation, and means for holding the bits in the grooves including a sleeve on the body having a part cooperating with the outer sides of the bits.

3. A tool of the character described including a body having a longitudinal opening and circumferentially spaced grooves in its forward end portion, countersink bits arranged in said grooves and adapted to project from said end of the body, and means for adjusting the bits radially including a screw actuated stem in said opening for engaging the inner sides of the bits, and a movable sleeve threaded on the body from its forward end for engaging the outer sides of the bits.

4. A tool of the character described including a body having a longitudinal opening and circumferentially spaced longitudinally disposed grooves in its forward end portion, countersink bits arranged in said grooves and adapted to project from the forward end of the body, and means for adjusting the bits radially including a stem threaded in said opening and operable from the other end of the body and adapted to engage the inner sides of the bits, a sleeve fitting over the bits and threaded on the forward end portion of the body, and an internal lip on the sleeve for engaging the outer sides of the bits so that the lip and stem clamp the bits in the desired positions.

LAWSON A. SMITH.